United States Patent [19]

Pennison et al.

[11] Patent Number: 4,799,833
[45] Date of Patent: Jan. 24, 1989

[54] CLUTCH FOR POSITIVE FEED DRILL

[75] Inventors: Robert A. Pennison, Bellville; Paul A. Biek, Houston, both of Tex.

[73] Assignee: Dresser Industries, Inc., Dallas, Tex.

[21] Appl. No.: 132,324

[22] Filed: Dec. 14, 1987

[51] Int. Cl.⁴ .................. B23B 45/00; F16D 11/00
[52] U.S. Cl. ...................... 408/132; 173/19; 173/146; 192/56 R; 192/89 A; 408/137; 408/139
[58] Field of Search .................. 408/5, 6, 10, 11, 132, 408/137, 139, 141; 192/46, 56 R, 67 R, 89 A, 108; 173/19, 29, 146

[56] References Cited

U.S. PATENT DOCUMENTS

| 1,762,155 | 6/1930 | Buss | 192/56 R |
|---|---|---|---|
| 1,793,221 | 2/1931 | Iversen | 192/89 A |
| 2,658,396 | 11/1953 | Christiance | 192/89 A |
| 3,512,434 | 5/1970 | Juhasz et al. | 408/137 |
| 4,418,767 | 12/1983 | Vindez | 408/132 |
| 4,538,942 | 9/1985 | Vindez | 408/137 |
| 4,591,299 | 5/1986 | Eckman | 408/1 R |
| 4,592,681 | 6/1986 | Pennison | 408/10 |
| 4,612,998 | 9/1986 | Vindez | 408/137 |

FOREIGN PATENT DOCUMENTS 0060186 9/1982 France .

Primary Examiner—Gil Weidenfeld
Assistant Examiner—Daniel W. Howell

[57] ABSTRACT

The invention relates to a torque-limiting clutch for use in combination with a positive feed drill that has a reversible motor and reversible driving means. A preferred use of the clutch is in combination with a drill that has a reversible motor rapid advance system. The clutch provides direct drive in a forward mode and is torque-limiting in a reverse mode so as to protect the gears from breaking due to excessive torque while the gears are turning in reverse during the rapid advance mode. In the reverse mode, the torque-limiting clutch protects the drill bit as it bears on the workpiece and prevents unscrewing of the drilling and mounting components. In a preferred embodiment the clutch is mounted on a shaft and is comprised of two clutch jaws that drive through lugs mounted on the jaws. The lugs provide direct drive in a forward rotation, but are shaped so as to allow the jaws to disengage when the torque is excessive in a reverse rotation.

19 Claims, 1 Drawing Sheet

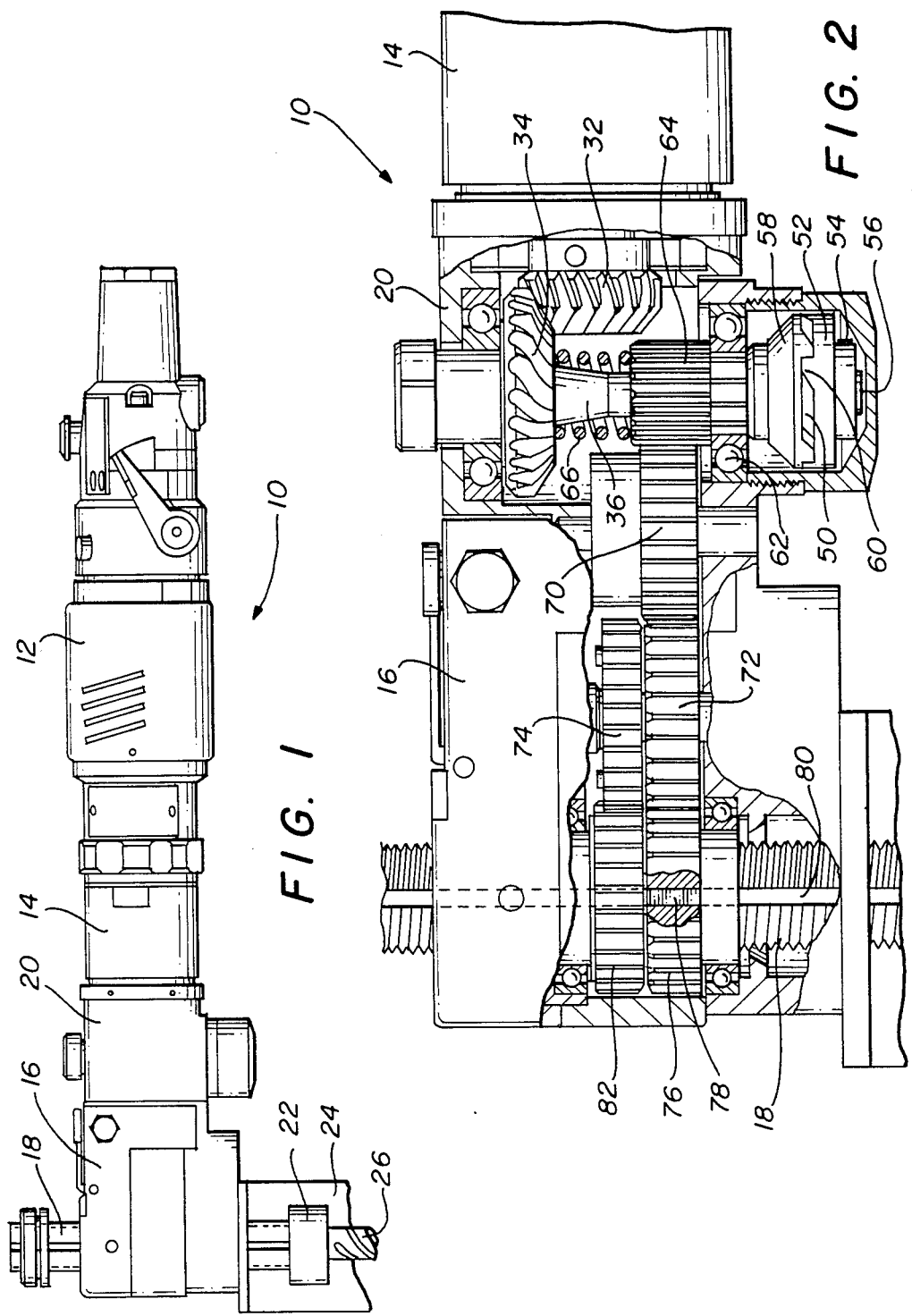

CLUTCH FOR POSITIVE FEED DRILL

TECHNICAL FIELD

This invention relates to a clutch for a positive feed drill that is a torque-limiting clutch which slips with the motor running in reverse when the drill bit or drill spindle encounter excessive torque in order to prevent damage to the drill bit or the positive feed drill and to prevent the drilling unit from unscrewing from its mounting.

BACKGROUND

This invention provides a clutch for a positive feed automatic drill with reversible motor rapid advance that slips when the drill spindle encounters excess torque in reverse to prevent damage to the drill, the drill bit or to the workpiece. The invention provides a clutch to be used in combination with a positive feed drill of the type disclosed and claimed in U.S. Pat. No. 4,591,299 and assigned to the same assignee as the present application. The disclosure of U.S. Pat. No. 4,591,299 is hereby incorporated by reference.

The invention disclosed in U.S. Pat. No. 4,591,299 provides a rapid feed apparatus to rapidly advance a drill bit to the surface of a workpiece. This is accomplished by running the motor in reverse with the feed gear locked or yieldably restrained from rotating. This causes the spindle to rapidly advance towards the workpiece with the bit rotating in a reverse direction. A yieldable or positive stop device located in the housing engages and prevents rotation of the feed gear when the feed gear is moved out of driving engagement with the main drive gear. The stop apparatus is yieldable when a predetermined torque is placed on the feed gear by the spindle feed gear during retraction or rapid feed movement so that the spindle feed gear rotates at the same speed as the spindle, thereby stopping the retraction or rapid feed movement of the spindle.

With a positive stop or even with a yieldable stop included in the drill, problems arise with excessive torque or torque overload during the rapid advance of the drill bit towards a workpiece. For example, the bit could wedge or lodge into an existing hole in the workpiece. The chuck or the depth stop or any of the spindle mounted accessories could strike an immovable part. Additionally, as the cutter encounters the workpiece in a reverse rotation it could bind causing a torque overload. If any of these should happen, or if for any reason the spindle is prevented from rotating, several things may occur: the drill head can unscrew from the tool nose, the drill may unscrew from its mounting, the drill bit may be damaged, or the gears may experience excessive torque causing a single or multiple failure of gear teeth.

To avoid these undesirable results, the present invention provides a clutch that has been devised to be used in conjunction with a positive feed drill and a reversible motor rapid advance system. The clutch is designed so that it is positive drive in a forward rotation but acts as a torque-limiting device in reverse (the rapid spindle advance mode). Therefore, it prevents damage to the drill, drill bit or to the workpiece, and it prevents unscrewing of the drill head or bit.

SUMMARY OF THE INVENTION

The present invention relates to a clutch to be used in combination with a positive feed drill with reversible motor and rapid advance with the clutch comprising a torque-limiting clutch that has positive drive in a forward rotation but disengages when it encounters excess torque in a reverse rotation. The positive feed drill includes a housing, a rotatable tool spindle capable of reciprocating movement, and driving means for rotating the spindle in feeding and retracting movements. In one embodiment, the driving means includes a spindle rotation gear to rotate the spindle and a spindle feed gear to move the spindle in feeding and retracting movements. A main drive gear is engaged with the spindle rotation gear and a feed gear which is engaged with the spindle feed gear. A shift apparatus is connected to the feed gear and is engageable for moving the feed gear out of driving engagement with the main drive gear. When not driven by the main drive gear and held stationary, the feed gear causes the spindle to retract, except when the motor is running in reverse. With the motor in reverse, the feed gear causes a rapid advance of the spindle towards a workpiece. The main drive gear is engaged with an idler gear which is in turn driven by a spur gear. The spur gear rotates freely around a clutch shaft and the gear is splined to the upper jaw of a clutch. The lower clutch jaw is driven by the clutch shaft through a broached hex. In one embodiment of the invention, 90° direct drive lugs on the clutch jaws drive the upper clutch jaw and the spur gear in a forward rotation. In reverse rotation, the jaws drive through inclined ramps. If the spur gear encounters a resistance to rotation against the idler gear greater than a desired level, the upper clutch jaw will slide over the inclined ramps and up against a spring moving axially on the clutch shaft. Thus, the clutch will disengage when the torque is too great in the reverse direction, thereby avoiding damage to the gears, transmission, the drill bit, and prevents disengagement of drill head from the mounting fixture.

When the torque level has subsided, the spring reengages the clutch. In one embodiment of the invention, the clutch imparts impulses of torque to the gears as the clutch engages and disengages intermittently. The amount of torque available for rapid advance in the reverse mode may be increased or decreased by changing the compressive force of the clutch spring. The torque capacity in the reverse mode must be enough to overcome the normal level of friction encountered in the gears, bearings and spindle attachments during operation of the drill.

Additionally, the torque-limiting clutch may be designed to provide a signal, either visual or audible, to alert the operator in the event the predetermined level of torque is exceeded and disengagement occurs.

BRIEF DESCRIPTION OF THE DRAWINGS

The foregoing and additional objects and advantages of the invention will be more apparent when the following Detailed Description is read in conjunction with the accompanying Drawings, wherein like reference characters denote like parts in all views and wherein:

FIG. 1 shows a side elevational view of an automatic drill; and

FIG. 2 is a cutaway view of the gear and clutch sections of a drill showing the relationship of the gears and the workings of the clutch.

DETAILED DESCRIPTION

The invention provides a torque-limiting clutch to be used in combination with a positive feed drill that has a reversible motor. The invention is most useful in combination with a drill capable of rapidly advancing a drill bit by running in reverse. This type of drill is disclosed in U.S. Pat. No. 4,591,299. The invention prevents damage to the drill, the workpiece, or the drill bit should the drill experience excessive torque while running in a reverse mode. The invention prevents the drill from disengaging from a twist and lock type mounting on a tooling fixture due to torque reactions while in a reverse mode of operation. The drill disclosed in U.S. Pat. No. 4,591,299 may be attached to its mounting with a bayonette style twist and lock type attachment. A one-quarter (¼) to three-quarters (¾) turn is needed to lock the drill to the fixture. A sleeve on the drill is locked to a positive stop in the tooling fixture in order to maintain the drill in a fixed position for uses requiring holes drilled with great precision. The torque-limiting clutch of the present invention prevents the application of torque in the reverse direction to the mounting structure. The invention also prevents the drill head or drill bit from unscrewing under excessive torque in a reverse mode. Excessive torque is considered to be that level of torque beyond the level encountered in normal operation and that would likely cause damage to the drill, drill bit or workpiece or that would loosen the drill bit or drill head from their mountings.

Referring to the drawing, FIG. 1 shows an automatic positive feed drill 10 that includes a reversible motor 12, planetary gears 14, a positive feed drill head 16, a reciprocating spindle 18, a housing 20, a drill chuck 22, a tool nose 24, and a drill bit 26 all operating to drill a hole in a workpiece. FIG. 1 shows one embodiment of the arrangement for drill 10.

FIG. 2 is a cutaway view of the drill head 16 showing the interaction of the various gears as they operate to rotate, feed, and retract the spindle 18. In forward operation, or the drilling mode, the motor 12 turns in a clockwise direction (as viewed from the rear) driving the planetary gear reduction 14 which in turn drives bevel pinion 32. Bevel pinion 32 drives bevel gear 34 which is pinned or keyed to clutch shaft 36. In one embodiment of the invention, bevel gear 34 is mounted on clutch shaft 36 and is pinned to it by use of a shear pin.

Also positioned on the clutch shaft 36 is the clutch 50. Lower clutch jaw 52 is firmly affixed both axially and rotationally to the clutch shaft 36 by a roll pin 54 and a hex broached hub 56. The upper clutch jaw 58 is driven in a positive fashion by a plurality of lugs 60 on the clutch jaws as shown in FIG. 2. The upper clutch jaw 58, the inner race of ball bearing 62 and a spur pinion 64 all rotate in unison on shaft 36 and can move upward on the shaft 36 against compression spring 66 when the clutch 50 disengages with the motor 12 running in reverse. The lugs 60 are shaped such that in a forward drive they are 90° direct drive lugs. In reverse, the lugs 60 drive through inclined ramps. FIG. 2 shows the lugs 60 engaged in forward drive. In forward drive, the bevel gear 34, clutch shaft 36, clutch 50 and spur pinion 64 all rotate in unison in a clockwise direction as viewed from the clutch end of the shaft 36.

In one embodiment of the invention, a series of gears connects the shaft 36 with the spindle 18. Spur pinion 64 drives idler gear 70 which drives the main drive gear 72.

In a forward drill mode, the main drive gear 72 is engaged with the feed gear 74 and they turn in unison. The main drive gear 72 is also engaged with a spindle rotation gear 76. The spindle rotation gear 76 slips over the spindle 18 and is attached by lugs or keys 78 that are disposed in four slots 80 formed longitudinally in the exterior of the spindle 18. This attachment allows transmission of rotational motion to the spindle 18 while permitting the spindle 18 to move longitudinally through spindle rotation gear 76.

Also mounted on spindle 18 is a spindle feed gear 82 that has interior threads to match with the exterior threads of spindle 18. Spindle feed gear 82 is driven by feed gear 74 while in the forward position as shown in FIG. 2. Spindle feed gear 82 threads the spindle 18 through the gear 82 and feeds it towards the workpiece. A differential exists between the spindle rotation gear 76 and the spindle feed gear 82 to allow the spindle 18 to be rotated and to be advanced towards the workpiece.

To retract spindle 18, the motor 12 remains running forward but the feed gear 74 is urged upward such that it disengages from the main drive gear 72. The feed gear 74 stops rotating and is locked in a stopped position. Since the feed gear 74 has stopped, the spindle feed gear 82 also stops turning which causes the spindle 18 to rotate through the internal threads of the spindle feed gear 82 and retract away from the workpiece.

A feature of one embodiment of the invention is the ability to rapidly advance the drill bit 26 from a retracted position towards the workpiece. This feature is disclosed in U.S. Pat. No. 4,591,299 which is incorporated by reference. With the spindle 18 retracted upwardly, the reversible motor 12 is started in the reverse direction. The feed gear 74 remains in the up and locked position so that it is not engaged with the main drive gear 72. Spindle feed gear 82 is also stopped and does not rotate. With the motor 12 running in reverse, spindle rotation gear 76 rotates the spindle 18 through the internal threads of the spindle feed gear 82 in a reverse direction. This rapidly advances the spindle 18 and the drill bit 26 towards the workpiece.

During the rapid advance cycle, the drill bit 26 may wedge or lodge into the workpiece or it may strike part of the tool nose 24. In addition, the drill head may unscrew from the tool nose. Any of these as well as other possible malfunctions may cause excessive torque on the drill bit 26 and thus on the gears of the drill. It may cause the drill bit 26 or the drill head to unscrew, or it may damage the drill bit, the workpeice or the gears by breaking off teeth. To avoid these results, the invention provides a clutch that will slip or disengage when the drill encounters excessive torque during the rapid advance cycle with the motor running in reverse.

The clutch 50 is positioned as shown in FIG. 2 (shown in the direct drive or forward mode). In a forward drilling mode, shaft 36 drives the lower clutch jaw 52 through a broached hex 56. The 90° direct drive lugs 60 drive the upper clutch in a forward rotation (clockwise when viewed from the clutch end of shaft 36) which also drives spur pinion 64. In the reverse mode, used during the rapid advance cycle, lower clutch jaw 52 drives upper clutch jaw 58 through inclined ramps on the lugs 60. If spur pinion 64 encounters more than a predetermined level of resistance to rotation as transmitted from the spindle 18 to spur pinion 64 through gears 76, 72, and 70, the clutch 50 will disengage by the upper clutch jaw 58 sliding up and over the inclined ramps on the lower clutch jaw 52. To disengage, upper clutch jaw 58, ball bearing 62, and spur pinion 64 move up against compression spring 66 to a disengaged position. Spring 66 will return the upper clutch jaw 58 to engagement as upper clutch jaw 58 slides over the lugs 60 on lower clutch jaw 52. Thus, the clutch 50 will engage and disengage sending impulses of torque to idler gear 70. As the clutch 50 slips, it reduces the torque encountered by the gears and prevents damage to the gear teeth and other parts of the drill head 16. When the torque returns to levels below a predetermined level, the clutch will continue to be engaged and operate in the rapid advance cycle. The level of torque that will cause the clutch 50 to disengage is set by adjusting the compressibility of spring 66. The limited torque capacity of the clutch in the reverse direction must be enough to overcome the normal level of friction encountered in the gear train, the spindle drive mechanism, and between the drill bit and the drill bushing during normal operation of the drill.

The torque-limiting clutch of the present invention provides the additional safety feature of preventing the drill from unscrewing from its mount and the loosening of the drill bushing. Positive feed drills are typically mounted to a tooling fixture with a drill bushing that has inclined ramps that engage lock screws that are affixed to the lock fixture. In mounting a drill, the drill bushing, which is threadably affixed to the tool nose, is inserted into a pilot hole of the tooling fixture and rotated counterclockwise so that the ramps engage the lock screws and effectively lock the drill to the tooling plate. To remove the drill, the drill and tool nose are simply rotated in a clockwise direction and lifted from the tooling fixture. When the drill is operating in the forward mode, the spindle and bit rotate in a clockwise direction producing a reactive torque that is counterclockwise in direction. This keeps the drill firmly mounted on the fixture. In a reverse mode, however, the rotation of the spindle and bit are in a counterclockwise direction. If the bit were to strike something, for example the workpiece, a reactive torque would be produced that would tend to disengage the ramps of the drill bushing from the lock screws thereby loosening the bit and the drill from its mountings. The torque-limiting clutch of the present invention prevents this safety hazard by slipping when such excessive torque is encountered with the motor running in reverse.

From the foregoing Detailed Description, it should be apparent that the invention described herein presents a torque-limiting clutch for use in a positive feed drill with a reversible motor. Having described but a single embodiment of the invention, it will be apparent to those skilled in the art that there may be many changes and modifications to this invention without departing from the spirit and scope of the invention.

What is claimed is:

1. A reversible clutch for use in combination with a positive feed drill having a reversible motor, said clutch being torque-limiting in a reverse direction and comprising:
    a clutch shaft;
    a first clutch jaw affixed to said shaft;
    a second clutch jaw slidably mounted on said shaft such that it rotates freely on the shaft;
    means for securing the first clutch jaw in engagement with the second clutch jaw such that the first clutch jaw drives the second clutch jaw in a positive direct drive in a forward rotation; and
    said means permitting limited torque in a reverse rotation by allowing the second clutch jaw to disengage from the first clutch jaw when the clutch experiences excessive torque in a reverse rotation.

2. The clutch of claim 1 wherein the means for securing the first and second clutch jaws in engagement in a forward rotation and allowing the clutch jaws to disengage when experiencing excessive torque in a reverse rotation includes:
    a clutch spring attached to the second clutch jaw such that it biases the second clutch jaw towards the first clutch jaw; and
    a plurality of lugs located on the first and second clutch jaws, said lugs being shaped to provide direct drive in a forward rotation with no slippage and being shaped to allow slippage in a reverse rotation.

3. The clutch of claim 2, wherein the lugs are shaped such that they are 90° direct drive lugs for forward rotation, and the lugs drive through inclined ramps in a reverse rotation, said inclined ramps allowing the second clutch jaw to drive over the first clutch jaw and slide along said shaft against the bias of said spring.

4. In a positive feed drill system, the combination comprising:
    a drill housing;
    a rotatable tool spindle mounted in the housing, and said spindle being capable of reciprocal movement in advancing and withdrawing;
    a reversible motor included in the housing;
    driving means located in the housing and operably interposed between the motor and the spindle for rotating and selectively advancing or withdrawing the spindle, said driving means having a forward mode and a reverse mode;
    a reversible clutch included in the driving means, said clutch having a forward mode and a reverse mode corresponding in the forward and reverse modes of the driving means;
    engaging means in said clutch for enabling the clutch to be in direct drive while in the forward mode;
    reverse means in said clutch for engaging the clutch while in the reverse mode; and
    disengaging means in said clutch for disengaging the clutch when the clutch encounters excessive torque in the reverse mode.

5. The combination of claim 4 wherein the clutch includes:
    a clutch shaft;
    a first clutch jaw affixed to said shaft;
    a second clutch jaw slidably mounted on the shaft such that it rotates freely on the shaft; and
    a clutch spring for biasing the second clutch jaw towards the first clutch jaw.

6. The combination of claim 5 wherein the engaging means includes a plurality of lugs located on the first clutch jaw and on the second clutch jaw, said lugs being shaped such that the lugs on the first jaw drive the lugs on the second jaw through direct drive in a forward mode.

7. The combination of claim 6 wherein the reverse means includes the lugs being shaped such that the lugs on the first jaw drive the lugs on the second jaw through inclined ramps while in a reverse mode.

8. The combination of claim 7 wherein the disengaging means includes the second clutch jaw sliding on the clutch shaft against the bias of the clutch spring as the inclined ramps on the lugs of the first clutch jaw and on the second jaw cause the lugs to disengage from driving contact as the second clutch jaw slips over the lugs on the first clutch jaw when excessive torque is encountered in reverse mode.

9. The combination of claim 4 further comprising reengaging means for reengaging the clutch when the torque in the reverse mode is no longer excessive.

10. The combination of claim 8 further comprising reengaging means for reengaging the clutch when the torque in the reverse mode is no longer excessive, said reengaging means including said clutch spring biasing said second clutch jaw into lug contact with the first clutch jaw.

11. The combination of claim 4 further comprising means for rapidly advancing the spindle with the driving means operating in a reverse mode.

12. The combination of claim 8 further comprising means for rapidly advancing the spindle with the driving means operating in a reverse mode.

13. In a positive feed drill system, the combination comprising:
a drill housing;
a rotatable tool spindle mounted in the housing, said spindle being capable of reciprocal movement in advancing and withdrawing;
a reversible motor included in the housing;
reversible gear means in said housing for rotating and selectively advancing or withdrawing the spindle;
means for rapidly advancing the spindle with the motor and gear means in reverse;
transmission means in said housing and interposed between said motor and said gear means, said transmission means for transmitting the motor output to said gear means;
a reversible clutch interconnecting the gear means and the transmission means;
said clutch including a shaft, a first clutch jaw affixed to the shaft, and a second clutch jaw slidably mounted on the shaft such that it rotates freely on the shaft;
biasing means for biasing said second clutch jaw toward said first clutch jaw;
forward engaging means for engaging said first clutch jaw with said second clutch jaw in direct drive in a forward rotation; and
reverse torque-limiting means for engaging said first clutch jaw with said second clutch jaw in a reverse rotation and for disengaging the first clutch jaw from the second clutch jaw when the clutch encounters excessive torque in a reverse rotation.

14. The combination of claim 13 wherein said biasing means includes a clutch spring.

15. The combination of claim 13 wherein said forward engaging means includes a plurality of lugs located on the first clutch jaw and on the second clutch jaw, said lugs having a face side which is 90° to the clutch jaw, and said lugs engaging on the face sides while in a forward rotation.

16. The combination of claim 15 wherein said reverse torque-limiting means includes the plurality of lugs having back sides that are an inclined ramp, said back sides contacting while the clutch is in a reverse rotation, and said second clutch jaw sliding over the inclined ramps on the lugs of the first clutch jaw and moving against the biasing means along the shaft so as to disengage the lugs on the clutch jaws when the clutch encounters excessive torque in a reverse rotation.

17. The combination of claim 13 further comprising reengaging means for reengaging the first clutch jaw and the second clutch jaw in a reverse rotation when the torque is no longer excessive.

18. The combination of claim 16 wherein the biasing means includes a clutch spring.

19. The combination of claim 18 wherein the clutch spring returns the clutch to engagement when torque is no longer excessive.

* * * * *